United States Patent [19]

Ootsuka et al.

[11] Patent Number: 4,698,726

[45] Date of Patent: Oct. 6, 1987

[54] STRUCTURE FOR ATTACHING A SWITCHGEAR TO A RAIL

[75] Inventors: Shigeharu Ootsuka, Kagamihara; Yuji Mizuno, Nagoya, both of Japan

[73] Assignee: Mitsubishi Denki Kabushiki Kaisha, Tokyo, Japan

[21] Appl. No.: 16,987

[22] Filed: Feb. 19, 1987

Related U.S. Application Data

[63] Continuation of Ser. No. 799,493, Nov. 19, 1985, abandoned.

[30] Foreign Application Priority Data

Nov. 19, 1984 [JP] Japan .................. 59-174318

[51] Int. Cl.$^4$ ............................................. H02B 1/04
[52] U.S. Cl. .................... 361/335; 335/132; 248/222.1; 361/376; 361/420; 439/716
[58] Field of Search ............... 361/331, 335, 346, 347, 361/348, 353, 376, 419, 417, 420, 427, 426, 380; 339/198 GA; 335/132; 200/293, 294, 307; 248/221.3, 222.1

[56] References Cited

U.S. PATENT DOCUMENTS

| 4,510,357 | 4/1985 | Winterbottom | 200/50 C |
| 4,570,078 | 2/1986 | Yashima | 200/50 C |

FOREIGN PATENT DOCUMENTS

| 2131570 | 12/1972 | Fed. Rep. of Germany | 200/50 C |
| 2510807 | 9/1976 | Fed. Rep. of Germany | 361/376 |
| 3145444 | 5/1983 | Fed. Rep. of Germany | 339/198 GA |
| 54-10455 | 5/1979 | Japan . | |

Primary Examiner—G. P. Tolin
Attorney, Agent, or Firm—Leydig, Voit & Mayer

[57] ABSTRACT

A structure for attaching to a flanged mounting rail assemblies of electrical devices such as contactors mechanically joined with each other. A device mounted to each of the contactors, for detachably attaching each contactor to the rail, has a fixed hook, and a movable hook for resiliently engaging with the rail, and an operating member connected to each of the movable hooks for substantially simultaneously moving the movable hooks; the operating member has a poriton accessible from the exterior for moving the movable hooks for allowing the device to be attached to or detached from the rail.

8 Claims, 5 Drawing Figures

4,698,726

STRUCTURE FOR ATTACHING A SWITCHGEAR TO A RAIL

This application is a continuation of Ser. No. 799,493, filed Nov. 19, 1985, now abandoned.

BACKGROUND OF THE INVENTION

This invention relates to a structure for detachably attaching to a rail a switchgear having two contactors mechanically and electrically joined with each other.

In the case of conventional structures of this kind, as shown in FIG. 1, a switchgear such as an integral electromagnetic contactor apparatus 21 comprises left and right electromagnetic contactors 22 and 23 mechanically and electrically integrally joined with each other. A movable hook 24 is slidably attached to each of the left and right electromagnetic contactors 22 and 23, respectively, and they are respectively biased by a spring (not shown) towards an unillustrated corresponding stationary hook attached to each contactor. Electric wiring is provided between the terminals of respective main contacts of the left and right electromagnetic contactors so as to open one main contact when the other main contact is closed.

When the electromagnetic contactor apparatus 21 is attached to a mounting rail 25, each movable hook 24 must be moved outwards against the elastic force of the spring to receive the rail 25 between the movable hooks 24 and the stationary hooks. Thereafter, when an operator takes his hand away from each movable hook 24, each movable hook 24 is urged by a spring toward its original position thereof so that the rail 25 is held between the movable and stationary hooks so that the electromagnetic contactors 22 and 23 are fit to the rail 25.

However, in such a conventional electromagnetic contactor apparatus, it is necessary to simultaneously move both of the movable hooks 24 outwards when the electromagnetic contactor apparatus 21 is attached and detached from the rail 25. It is not easy to manually move outwards both of the movable hooks 24 simultaneously, and therefore it is not easy to attach and detach the electromagnetic contactor apparatus 21 with respect to the rail 25.

In another conventional electromagnetic contactor apparatus, as shown in FIG. 2, a thermal relay 26 for preventing overheating of the apparatus is attached to the left electromagnetic contactor 22 for example, and there is wiring between the terminals of the respective main contacts of the left and right electromagnetic contactors 22 and 23 so as to open one main contact when the other main contact is closed. Such a thermal relay 26 does not allow an operator to simultaneously move outwards both the left and right movable hooks 24 attached to the left and right electromagnetic contactors 22 and 23, respectively.

When only one movable hook 24 is movably attached to either one of the electromagnetic contactors 22 and 23 to facilitate the attachment and detachment of the apparatus with respect to the rail, the strength of the hook is insufficient and the balance of the apparatus is lost when the apparatus is attached to the rail.

SUMMARY OF THE INVENTION

To overcome the above disadvantages, an object of the present invention is to provide an apparatus for attaching to a rail a switchgear having two contactors mechanically joined with each other in which it is easy to simultaneously attach or detach both of the contactors with respect to the rail.

With the above object in view, the present invention resides in a structure for attaching to a mount rail a switchgear having two contactors mechanically joined with each other comprising means, mounted to each of the contactors, for detachably attaching each contactor to the rail, said attaching means having a movable hook for resiliently engaging with the rail, and an operating member connected to each of said movable hooks for substantially simultaneously moving said movable hooks, said operating member having a portion accessible from the exterior of said switchgear for moving said movable hooks for allowing the switchgear to be attached to or detached from the rail.

BRIEF DESCRIPTION OF THE DRAWINGS

The present invention will be now described with reference to the preferred embodiments thereof in conjunction with the accompanying drawings in which.

DETAILED DESCRIPTION OF THE PREFERRED EMBODIMENTS

Figure 3:
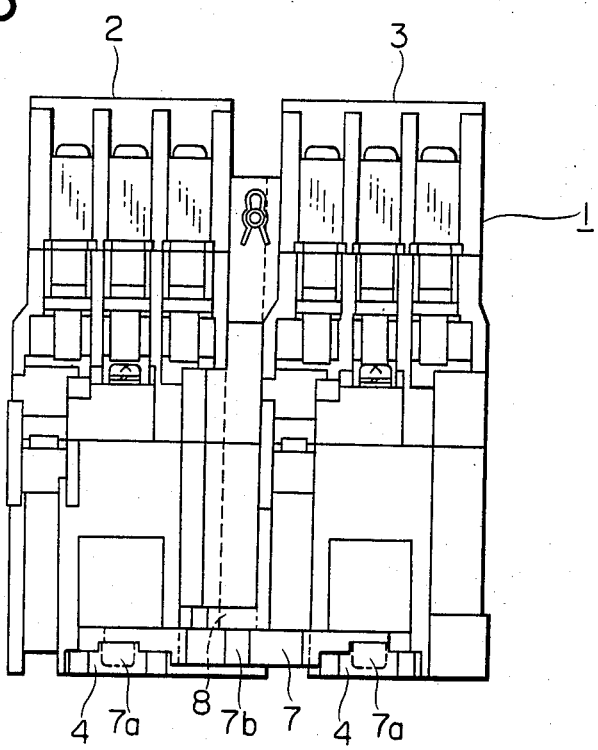
FIG. 3 is a side view of an electromagnetic contactor apparatus according to the present invention.
Figure 4:
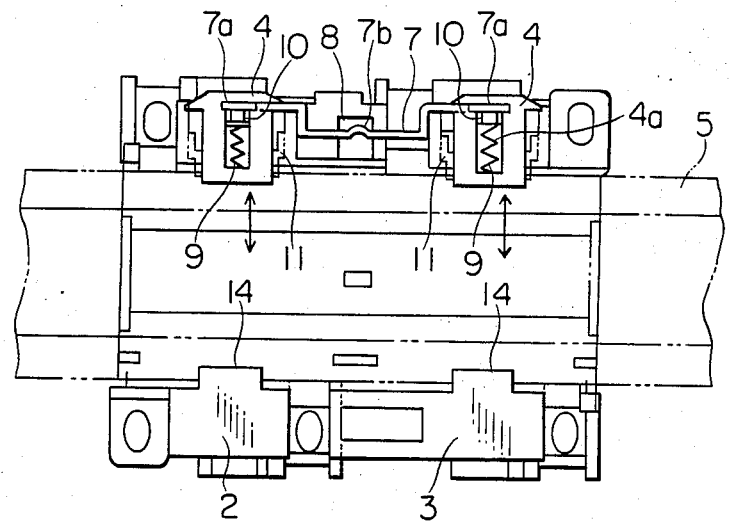
FIG. 4 is a bottom view of the electromagnetic contactor apparatus of FIG. 3.
Figure 5:
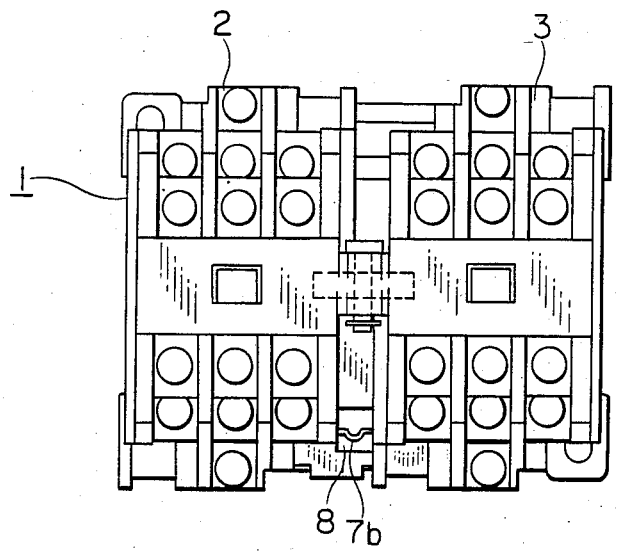
FIG. 5 is a top view of the electromagnetic contactor apparatus of FIG. 3.

As shown in FIGS. 3 to 5, an integral electromagnetic contactor apparatus according to the present invention comprises left and right electromagnetic contactors 2 and 3 mechanically and electrically joined with each other. An electric wiring is formed between the terminals of respective main contacts of the left and right electromagnetic contactors so as to open one main contact when the other main contact is closed. A stationary hook 14 is secured to the bottom surface of each of the electromagnetic contactors 2 and 3. A movable hook 4 is slidably attached to the bottom surface of each of the electromagnetic contactors 2 and 3 through a support member 11 which is integral with each movable hook 4. The movable hooks 4 respectively oppose the stationary hooks 14 and cooperate with the stationary hooks 14 for attaching and detaching the integral electromagnetic contactor apparatus 1 with respect to a rail 5. A hole 4a is disposed within each movable hook 4 to receive a spring 9 for biasing each movable hook 4 toward each stationary hook 14. Each spring 9 is inserted in a compressed state between each movable hook 4 and a projection 10 disposed on the bottom surface of each electromagnetic contactor. Thus each movable hook 4 can be moved towards or away from each stationary hook 14 as shown by the arrow of FIG. 4.

According to the present invention, an operating member or a hook connecting fitting 7 is mounted between the bottom surface of the contactor housing and the upper surfaces of the movable hooks 4. The hook connecting fitting 7 is preferably made of a metallic plate, and the intermediate portion of the fitting 7 is bent by pressing into a U shape the trough portion of which is bent towards the rail 5. Each end 7a of the hook connecting fitting 7 is inserted into the hole 4a of each hook 4 to engage the fitting 7 with each hook 4. The central portion of the U-shaped intermediate portion of the hook connecting fitting 7 is adjacent a predetermined elongated hole 8 formed between the electromagnetic contactors 2 and 3, as shown in FIGS. 4 and 5. An outwardly curved portion 7b projecting away from the rail 5 is formed in the central portion of the U-shaped intermediate portion of the hook connecting fitting 7 to receive a tool, such as a screw driver, inserted through the elongated hole 8 for moving the fitting 7 outwards. The movable and stationary hooks and the spring as mentioned above may be similar to those shown in U.S. patent application Ser. No. 731,641. The movable and stationary hooks 4 and 14 and the hook connecting fitting 7 constitute an apparatus for attaching a switchgear to a rail according to the present invention.

Figure 1:
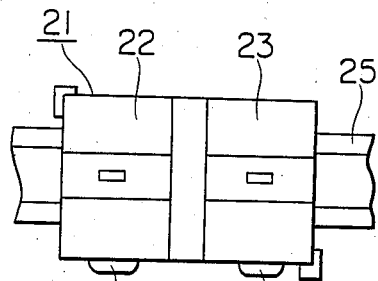
FIG. 1 is a view showing a conventional electromagnetic contactor apparatus attached to a rail.
Figure 2:
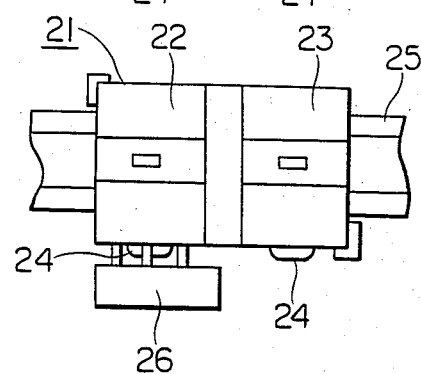
FIG. 2 is a view showing another conventional electromagnetic contactor apparatus attached to a rail.

In the electromagnetic contactor apparatus constructed above, the end of a tool such as a screw driver is inserted through the elongated hole 8 and under the inside of the outward curved portion 7b, and the screw driver is rotated around a contact point at which the end of the screw driver contacts the body of the contactor apparatus, thereby moving outwards the hook connecting fitting 7. Since both ends 7a of the hook connecting fitting 7 are firmly fitted into the respective holes 4a of the movable hooks 4, both of the hooks 4 can be simultaneously moved outwards against the elastic force of the springs 9 when the hook connecting fitting 7 is moved outwards, thereby disengaging the movable hooks 4 from the rail 5. Thus the electromagnetic contactor apparatus 1 can be detached from the rail 5. When the contactor apparatus 1 is being attached to the rail 5, the operation is similar to the operation mentioned above. The present invention can be applied to an electromagnetic contactor apparatus in which a thermal relay is disposed to prevent overheating of the apparatus and in which there is wiring between the terminals of the respective main contacts of the left and right electromagnetic contactors so as to open one main contact when the other main contact is closed as in the conventional apparatus of FIG. 2. It is easy to attach and detach the apparatus with respect to the rail even in such an apparatus.

Since the intermediate portion of the hook connecting fitting 7 is bent into a U shape and therefore has great strength, the deformation of the hook connecting fitting 7 when it is moved outwards can be prevented. Since the hook connecting fitting 7 is securely inserted and held between the hooks 4 and the contact body, the hook connecting fitting 7 cannot be prevented from coming off the hooks 4. A similar effect can be obtained even when a groove instead of a hole 4a is formed in each movable hook 4.

As mentioned above, according to the present invention, when the intermediate portion of the hook connecting fitting 7 is moved outwards, both of the movable hooks 4 are simultaneously moved outwards so that it is easy to attach and detach the electromagnetic contactors 2 and 3 with respect to the rail 5, reducing the number of operations at the times of attachment, wiring and detachment of the electromagnetic contactor apparatus.

The invention has been described with reference to assemblies of contactors, however, the invention is also applicable to assemblies of other types of electrical devices suitable for mounting on rails.

What is claimed is:

1. A structure which mounts an assembly of electrical devices mechanically joined with each other to a rail, the structure comprising:
    a movable hook on each of said devices detachably and resiliently engaging said rail, each of said hooks having a hole therein; and
    an operating member having opposite ends and a central portion located between said opposite ends, each of said opposite ends inserted into the hole of eah movable hook and being accessible from the exterior of said assembly for moving said hooks simultaneously to enable said assembly to be attached to or detached from said rail, said central portion being bent into a U-shape which has a through portion bent toward said rail and a recessed portion open toward said rail for receiving therein a tool for operating said movable hooks.

2. A structure as claimed in claim 1 wherein each of said electrical devices has a stationary hook fixedly secured thereto in spaced opposing relation to the corresponding movable hook so as to cooperate therewith for attaching said assembly to said rail.

3. A structure as claimed in claim 2 wherein each said movable hook is movable toward and away from the corresponding stationary hook, said structure further comprising means for biasing said movable hooks toward said stationary hooks.

4. A structure as claimed in claim 3 wherein said means for biasing each said movable hook toward each said stationary hook comprises a spring received in the hole of each movable hook.

5. A structure which mounts a switchgear having two contactors mechanically joined each other to a rail, the structure comprising:
    a movable hook on each of said contactors detachably and resiliently engaging said rail, each of said hooks having a hole therein; and
    an operating member having opposite ends and a central portion located between said opposite ends, each of said opposite ends inserted into the hole of each movable hook and being accessible from the exterior of said switchgear for moving said hooks simultaneously to enable said switchgear to be attached to or detached from said rail, said central portion being bent into a U-shape which has a through portion bent toward said rail and a recessed portion open towad said rail for receiving therein a tool for operating said movable hooks.

6. A structure as claimed in claim 5 wherein each of said electrical devices has a stationary hook fixedly secured thereto in spaced opposing relation to the corresponding movable hook so as to cooperate therewith for attaching said switchgear to said rail.

7. A structure as claimed in claim 6 wherein each said movable hook is movable toward and away from the corresponding stationary hook, said structure further comprising means for biasing said movable hooks toward said stationary hooks.

8. A structure as claimed in claim 7 wherein said means for biasing said movable hooks toward said stationary hooks comprises a spring received in the hole of each movable hook.

* * * * *